US012700628B2

(12) United States Patent
Hsiao

(10) Patent No.: US 12,700,628 B2
(45) Date of Patent: Aug. 4, 2026

(54) DOUBLE-LAYERED THERMAL INTERFACE MATERIAL STRUCTURE, MANUFACTURING METHOD THEREOF, AND BATTERY DEVICE HAVING THE SAME

(71) Applicant: T-Global Technology Co., Ltd., Taoyuan City (TW)

(72) Inventor: Ming-Hsien Hsiao, Taoyuan City (TW)

( * ) Notice: Subject to any disclaimer, the term of this patent is extended or adjusted under 35 U.S.C. 154(b) by 836 days.

(21) Appl. No.: 17/827,531

(22) Filed: May 27, 2022

(65) Prior Publication Data

US 2023/0387500 A1 Nov. 30, 2023

(51) Int. Cl.
| | |
|---|---|
| *H01M 10/6551* | (2014.01) |
| *B29C 70/68* | (2006.01) |
| *H01M 10/643* | (2014.01) |
| *H01M 10/653* | (2014.01) |
| *H01M 10/6555* | (2014.01) |
| *H01M 50/213* | (2021.01) |

(52) U.S. Cl.
CPC ....... *H01M 10/6555* (2015.04); *B29C 70/688* (2013.01); *H01M 10/643* (2015.04); *H01M 10/653* (2015.04); *H01M 10/6551* (2015.04); *H01M 50/213* (2021.01); *H01M 2220/20* (2013.01)

(58) Field of Classification Search
None
See application file for complete search history.

(56) References Cited

U.S. PATENT DOCUMENTS

2020/0259230 A1* 8/2020 Lee ..................... H01M 10/617

FOREIGN PATENT DOCUMENTS

| | | | | |
|---|---|---|---|---|
| CN | 101930952 A | * | 12/2010 | ............ F28F 13/003 |
| CN | 105811046 A | * | 7/2016 | .......... H01M 10/613 |
| CN | 111799405 A | | 10/2020 | |
| CN | 112349998 A | | 2/2021 | |

* cited by examiner

*Primary Examiner* — Zhongqing Wei

(57) ABSTRACT

A double-layered thermal interface material (TIM) structure is disclosed. The double-layered TIM structure is adopted for being sandwiched between each two adjacent N rows of battery cells of a battery module. According to the present invention, the double-layered TIM structure comprises a layer structure comprising a top surface and a bottom surface, of which the top surface and the bottom surface both have a plurality of concave portions. Moreover, there is a supporting mesh plate buried in the layer structure for making the layer structure simultaneously possess advantages of softness, good malleability and good support capability. Therefore, when this novel double-layered TIM structure is adopted in assembling N rows of battery cells to become a battery module, there are no interfacial gaps between the two adjacent rows of battery cells and the double-layered TIM structure.

4 Claims, 12 Drawing Sheets

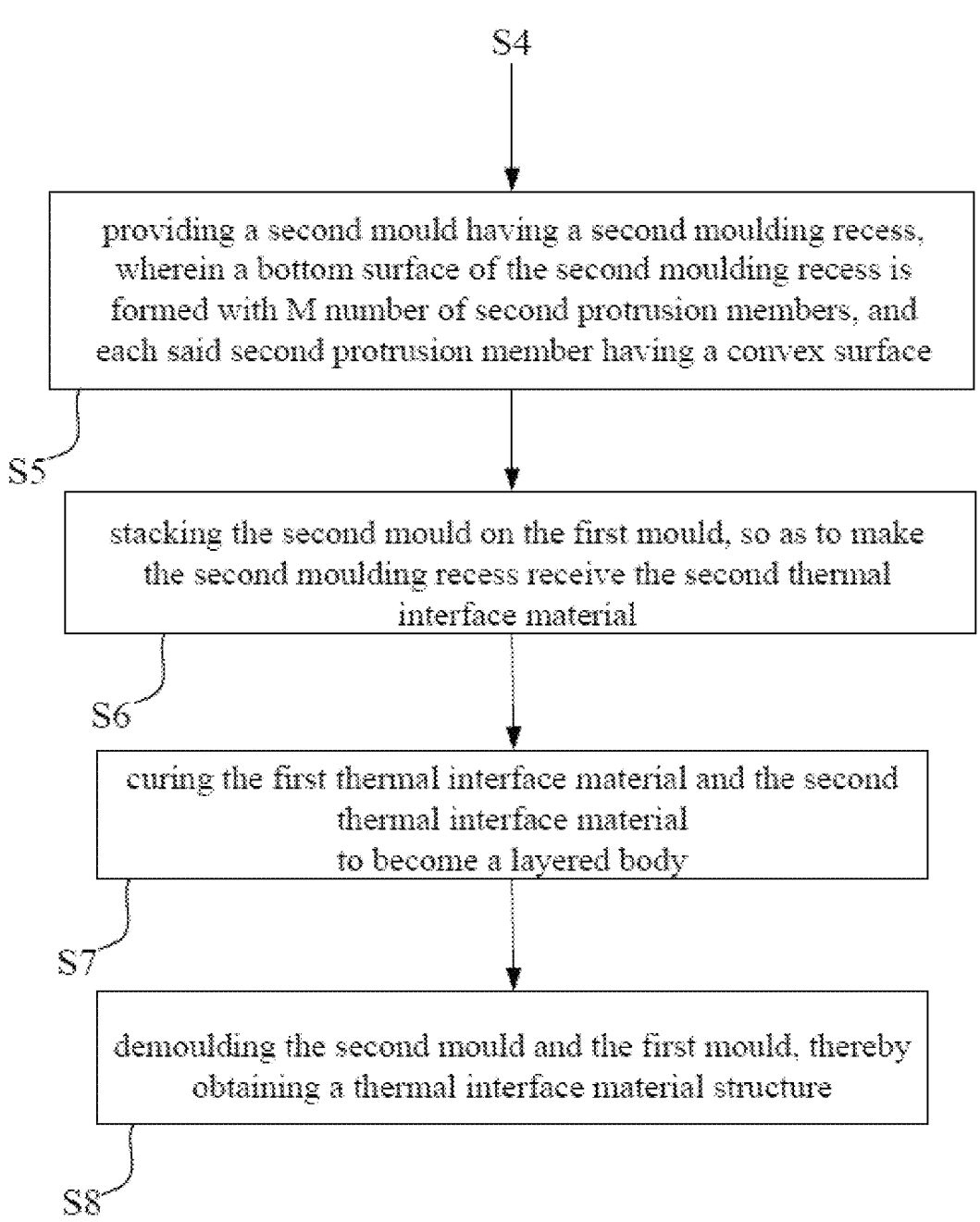

S4 providing a second mould having a second moulding recess, wherein a bottom surface of the second moulding recess is formed with M number of second protrusion members, and each said second protrusion member having a convex surface

S5 stacking the second mould on the first mould, so as to make the second moulding recess receive the second thermal interface material

S6 curing the first thermal interface material and the second thermal interface material to become a layered body

S7 demoulding the second mould and the first mould, thereby obtaining a thermal interface material structure

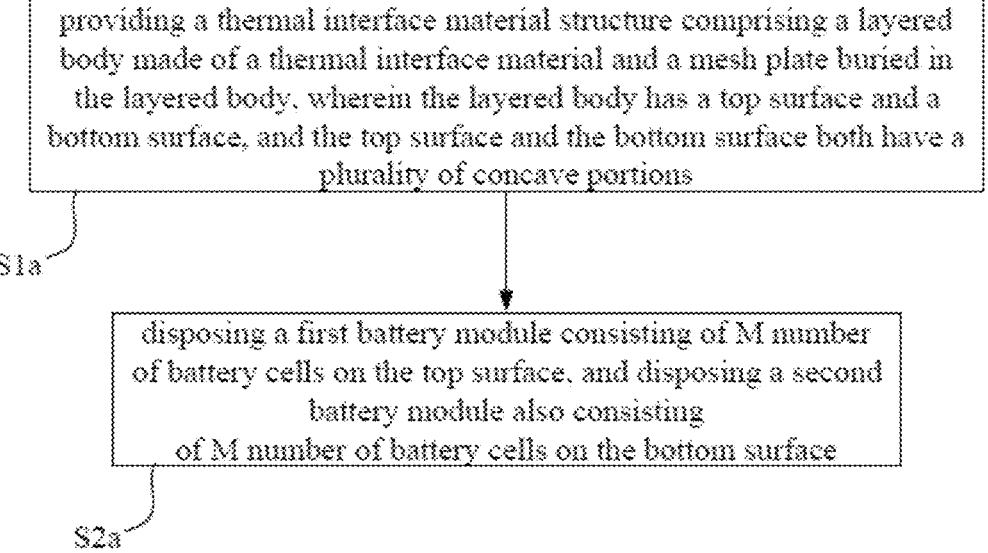

providing a thermal interface material structure comprising a layered body made of a thermal interface material and a mesh plate buried in the layered body, wherein the layered body has a top surface and a bottom surface, and the top surface and the bottom surface both have a plurality of concave portions S1a disposing a first battery module consisting of M number of battery cells on the top surface, and disposing a second battery module also consisting of M number of battery cells on the bottom surface S2a

FIG.8

DOUBLE-LAYERED THERMAL INTERFACE MATERIAL STRUCTURE, MANUFACTURING METHOD THEREOF, AND BATTERY DEVICE HAVING THE SAME

BACKGROUND OF THE INVENTION

1. Field of the Invention

The present invention relates to the technology field of battery device of electric vehicle, and more particularly to a double-layered thermal interface material structure applied to the manufacture of a battery module or a battery pack.

2. Description of the Prior Art

All-electric vehicles (EVs), also referred to as battery electric vehicles, have an electric motor instead of an internal combustion engine. The vehicle uses a large traction battery pack to power the electric motor and must be plugged in to a wall outlet or charging equipment, also called electric vehicle supply equipment (EVSE). As explained in more detail, electric vehicle battery (EVB) is the foregoing traction battery pack used to power the electric motor of a battery electric vehicle (BEV) or a hybrid electric vehicle (HEV), and the electric vehicle battery (EVB) typically designed to be a battery pack comprising a plurality of battery cells and a battery management circuit. FIG. 1 shows a perspective view of a conventional battery pack. As FIG. 1 shows, the conventional battery pack 1a, also called multi-cell battery pack, principally comprises: a plurality of battery cells 11a, a plurality of battery holders 12a and a battery management circuit 13a. In practical use, the battery pack 1a is accommodated in a housing so as to form a rechargeable battery device.

For enhancing the heat dissipation efficiency of the battery pack 1a, the battery manufacturer commonly fills the heat conductive material in the gaps between the plurality of battery cells 11a, or disposes a heat conductive member between two adjacent battery cells. For example, the China patent, publication No. CN111799405A, comprises disclosed a battery pack. The disclosed battery module comprises a plurality of cylindrical battery cells arranged into a plurality of columns and a plurality of rows. According to the disclosures of the China patent, publication No. CN111799405A, there is a spacing region between two adjacent cylindrical battery cells comprises, and there is a thermally conductive rod disposed for a plurality of spacing regions, and furthermore, the conductive fillers are filled in the rest of the spacing regions.

Therefore, it is understood that the conventional battery pack disclosed by China patent, publication No. CN111799405A, comprises some drawbacks summarized in follows.

(1) When manufacturing the battery pack, it needs to dispose the multiple battery cells in an accommodating base and place them evenly. After that, it also needs to dispose multiple heat conductive rods into the spacing regions, and to fill the conductive fillers in the remaining spacing regions. In a word, the conventional battery pack needs a complicated procedure.

(2) The manufacturing process error of the battery cells and/or the heat conductive rods causes some heat conductive rods fail to be embedded into the corresponding spacing regions, resulting in the manufacture failure of the battery pack.

According to the above descriptions, it is understood that there are rooms for improvement in the conventional heat dissipation solution applied to the manufacturing of battery packs. In view of that, the inventors of the present application have made great efforts to make inventive research and eventually provided a double-layered thermal interface material structure applied to the manufacture of a battery module or a battery pack.

SUMMARY OF THE INVENTION

The primary objective of the present invention is to disclose a double-layered thermal interface material (TIM) structure for the application of the battery module, wherein the double-layered TIM structure is sandwiched between two adjacent rows of the battery cells in the battery module. According to the present invention, a layer structure comprising a top surface and a bottom surface is manufactured for fitting in the gap between two adjacent rows of battery cells, therefore the top surface and the bottom surface both comprise a plurality of concave portions. Particularly, there is a supporting mesh plate buried in the layer structure, therefore the layer structure comprise all the advantages of softness, good malleability and good support capability. Therefore, when this novel double-layered TIM structure is adopted in assembling N rows of battery cells to become a battery module, the double-layered TIM structure is firstly stacked on a first row of battery cells, and then a second row of battery cells is tacked on the double-layered TIM structure. Subsequently, another double-layered TIM structure is firstly stacked on the second row of battery cells, and then the third row of battery cells is tacked on the second double-layered TIM structure. At last, (N−1) layers of the double-layered TIM structure and N rows of the battery cells are therefore assembled to form one battery module.

For achieving the primary objective mentioned above, the present invention provides an embodiment of the double-layered thermal interface material structure, comprising:

a layer structure, being made of a thermal interface material, and comprising a body thickness; and a supporting mesh plate, being buried in the layer structure, and comprising a plate thickness that is smaller than the body thickness;

wherein the layer structure comprises a top surface and a bottom surface, and the top surface and the bottom surface both comprise a plurality of concave portions;

wherein the supporting mesh plate comprises a plurality of pores, and each of the pores is fulfilled with the thermal interface material.

In one embodiment, the body thickness is in a range between 0.2 mm and 30 mm, and the plate thickness being in a range between 0.01 mm and 20 mm.

In one embodiment, the supporting mesh plate is made of at least one material selected from a group consisting of fiberglass, carbon fiber, polyvinylamine, carbon steel, stainless steel, copper alloy, and aluminum alloy, and the pore comprises a sieve size in a range between 10 mesh and 200 mesh.

In one embodiment, the double-layered thermal interface material comprises a polymer matrix and a plurality of thermal conductive fillers distributed in the polymer matrix, and the thermal conductive filler comprises at least one selected from a group consisting of metal oxide particles, nitride particles, carbide particles, diboride particles, graphite particles, and metal particles.

In one embodiment, the top surface and the bottom surface are both provided with a heat conductive protection layer thereon, and the heat conductive protection layer is made of a material selected from a group consisting of paraffin, epoxy resin, polyurethane, silicone, rubber, polypropylene, and thermally conductive phase change material.

In one embodiment, the layer structure comprises a first hardness, and the heat conductive protection layer comprises a second hardness that is greater than the first hardness.

Moreover, the present invention also provides a double-layered thermal interface material structure manufacturing method, comprising the steps of:

(1) providing a first mould comprising a first moulding recess, wherein a bottom surface of the first moulding recess is formed with M units of first protrusion member, M being an integer, and each of the first protrusion members comprising a convex surface;

(2) filling a first thermal interface material into the first moulding recess;

(3) disposing a supporting mesh plate in the first moulding recess;

(4) filling a second thermal interface material into the first moulding recess, and being positioned on the supporting mesh plate;

(5) providing a second mould comprising a second moulding recess, wherein a bottom surface of the second moulding recess is formed with M units of second protrusion member, and each of the second protrusion members comprising a convex surface;

(6) stacking the second mould on the first mould, so as to make the second moulding recess receive the second thermal interface material;

(7) curing the first thermal interface material and the second thermal interface material to become a layer structure; and (8) demoulding the second mould and the first mould, thereby obtaining a double-layered thermal interface material structure.

In one embodiment, the first thermal interface material and the second thermal interface material both comprise a polymer matrix and a plurality of thermal conductive filler spread in the polymer matrix, and the thermal conductive filler comprising at least one selected from a group consisting of metal oxide particles, nitride particles, carbide particles, diboride particles, graphite particles, and metal particles.

In one embodiment, the polymer matrix is selected from a group consisting of thermosetting polymer, photocureable polymer and mixture of polymer and curing agent.

In one embodiment, the top surface and the bottom surface are both provided with a heat conductive protection layer thereon, and the heat conductive protection layer being made of a material selected from a group consisting of paraffin, epoxy resin, polyurethane, silicone, rubber, polypropylene, and thermally conductive phase change material. The layer structure comprises a first hardness, and the heat conductive protection layer comprises a second hardness that is greater than the first hardness.

Furthermore, the present invention also provides a battery device, which is a battery pack or a battery module, and is characterized in that: comprising the foregoing double-layered thermal interface material structure.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 6A and FIG. 6B show flowcharts of a double-layered thermal interface material structure manufacturing method according to the present invention;

FIG. 8 shows a flowchart of a battery device manufacturing method according to the present invention;

DETAILED DESCRIPTION OF THE PREFERRED EMBODIMENTS

To more clearly describe a double-layered thermal interface material structure applied to the manufacture of a battery module or a battery pack according to the present invention, embodiments of the present invention will be described in detail with reference to the attached drawings hereinafter.

Double-layered thermal interface material structure and battery device comprising the same are provided.

Figure 1:
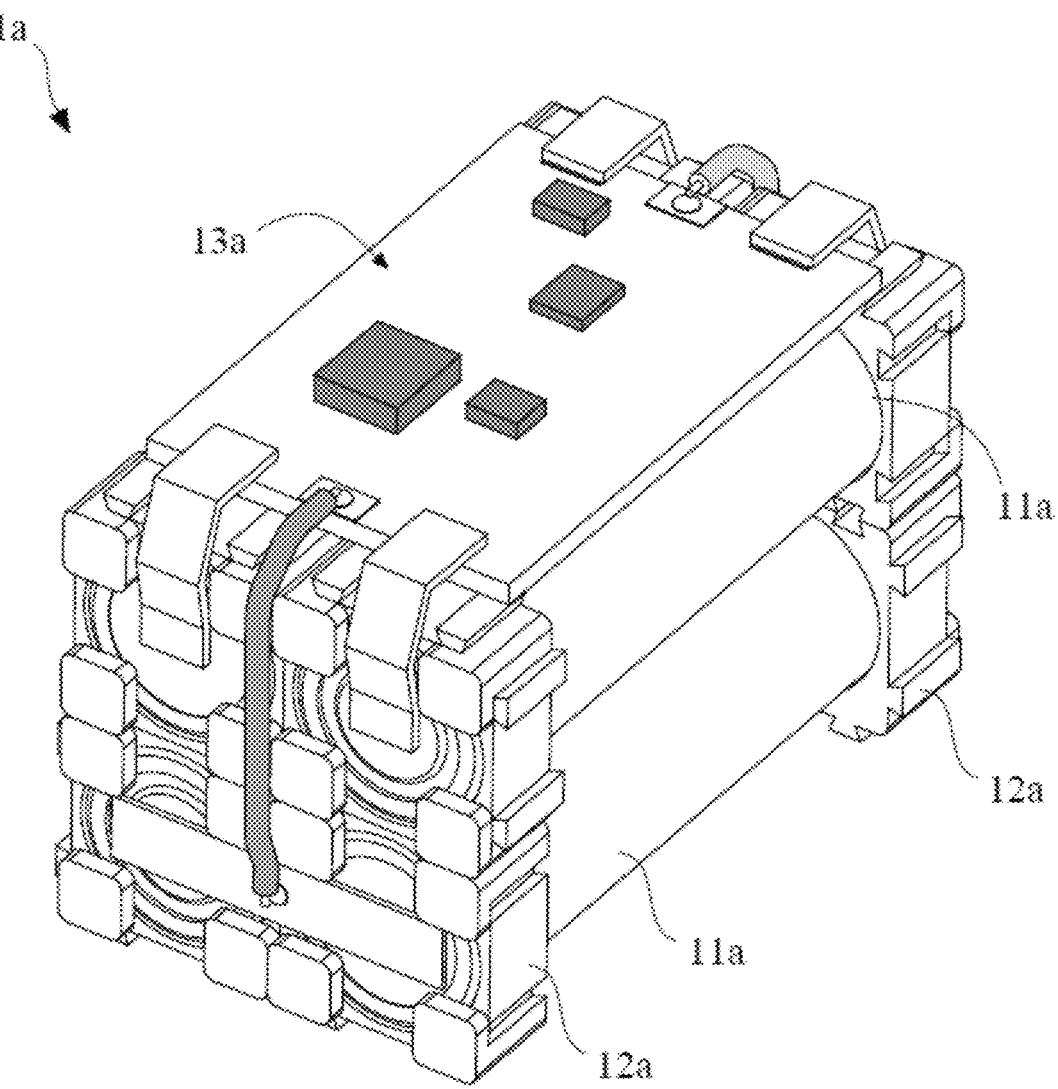
FIG. 1 shows a perspective view of a conventional battery pack.
Figure 2:
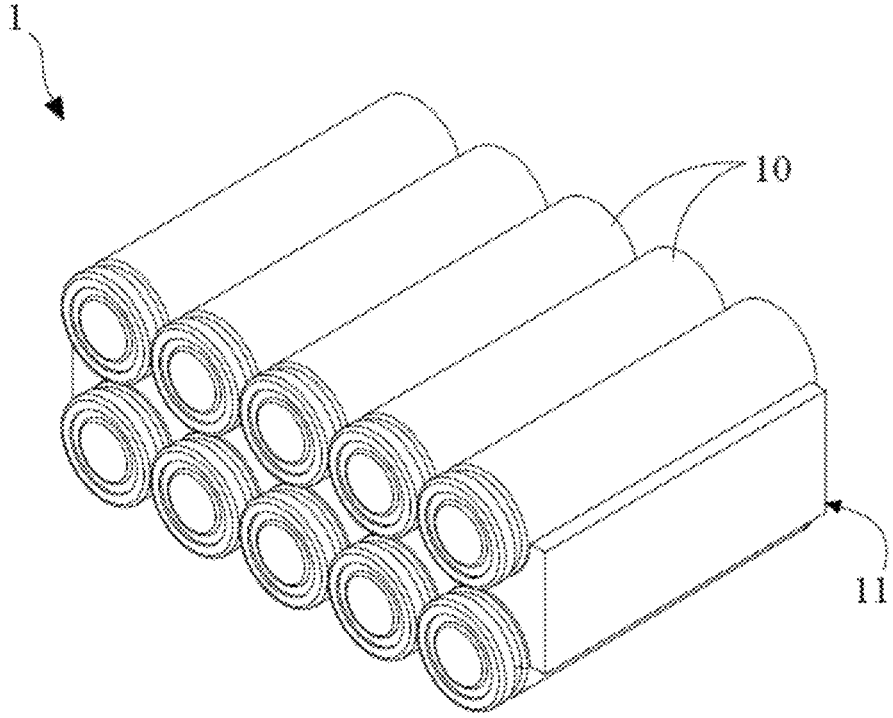
FIG. 2 shows a perspective view of a battery device comprising a double-layered thermal interface material structure according to the present invention.
Figure 3:
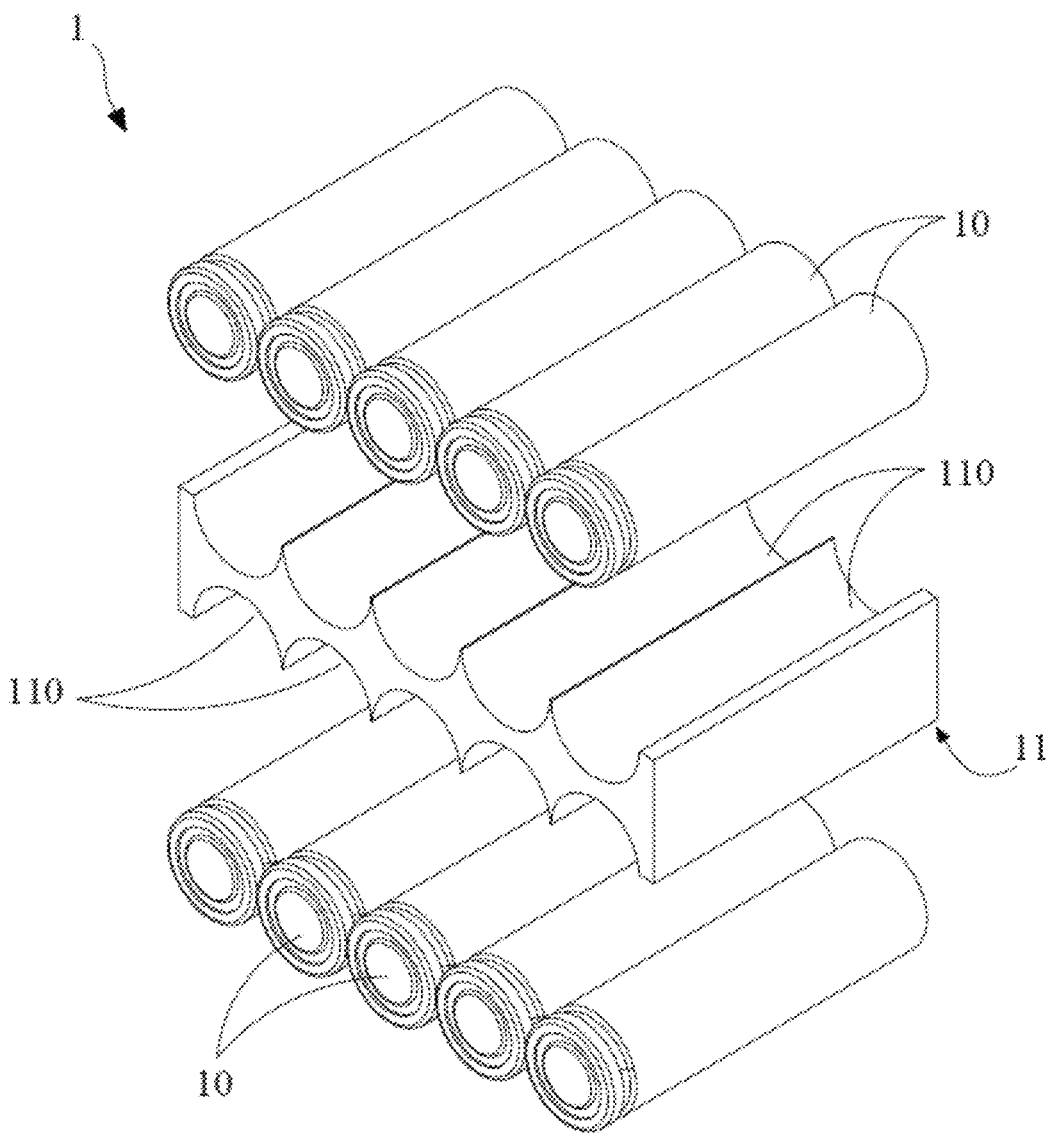
FIG. 3 shows an exploded view of the battery device.

With reference to FIG. 2, it shows a perspective view of a battery device comprising a double-layered thermal interface material structure according to the present invention. Moreover, FIG. 3 shows an exploded view of the battery device. As FIG. 2 and FIG. 3 show, the present invention discloses a double-layered thermal interface material (TIM) structure 11 for application in a battery device 1, so as to make the double-layered TIM structure 11 be sandwiched between two adjacent rows of battery cells 10 of the battery device 1. As explained in more detail below, when manufacturing the battery device 1, multiple battery cells 10 are firstly assembled to be a battery module (i.e. a row of battery cells 10), and then at least one battery module and a battery management circuit are integrated to become the battery device 1.

Figure 4:
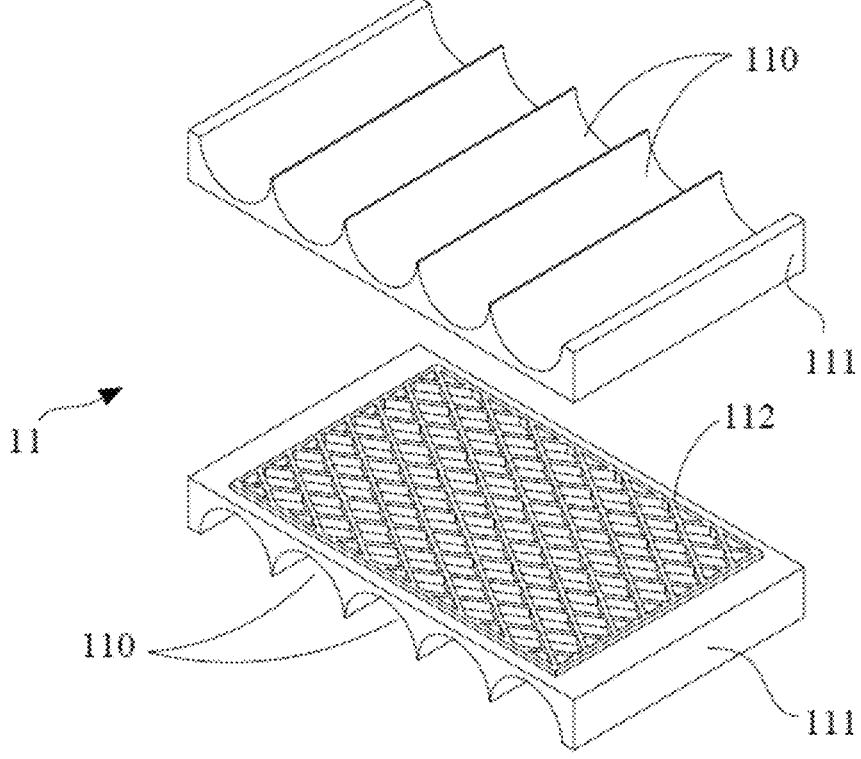
FIG. 4 shows an exploded view of the double-layered thermal interface material structure according to the present invention.
Figure 5:
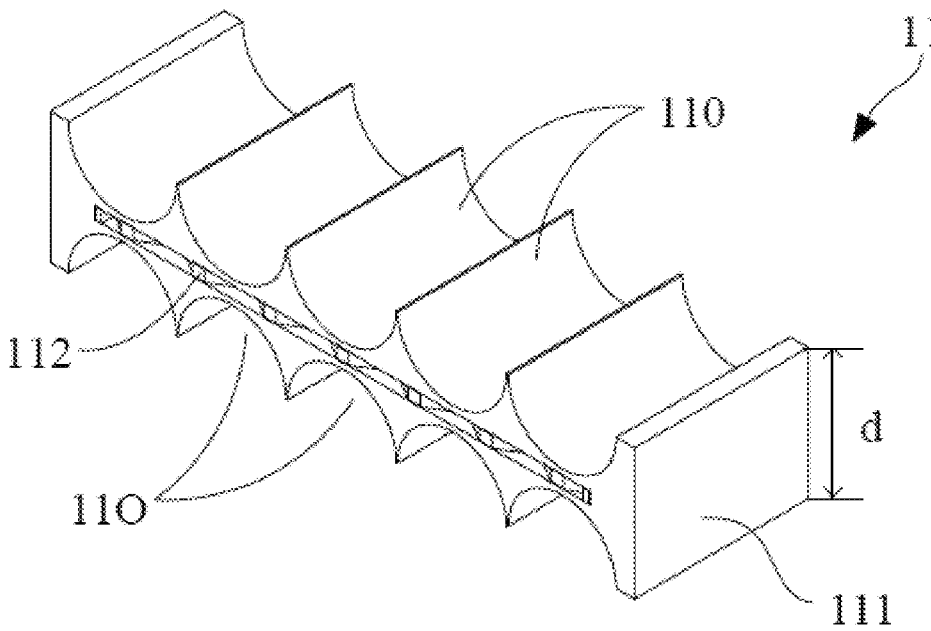
FIG. 5 shows a sectional view of the double-layered thermal interface material structure according to the present invention.

FIG. 4 shows an exploded view of the double-layered thermal interface material structure according to the present invention. Moreover, FIG. 5 shows a sectional view of the double-layered thermal interface material structure according to the present invention. As FIG. 3, FIG. 4 and FIG. 5 show, the double-layered TIM structure 11 comprises a layer structure 111 and a supporting mesh plate 112 buried in the layer structure 111. In which, the layer structure 111 is made of a thermal interface material, and comprises a body thickness. On the other hand, the supporting mesh plate 112 comprises a plurality of pores, and comprises a plate thickness that is smaller than the body thickness. In addition, the body thickness is in range between 0.2 mm and 30 mm, and the plate thickness is in range between 0.01 mm and 20 mm.

According to the present invention, the layer structure 111 comprises a top surface and a bottom surface, and the top surface and the bottom surface both have a plurality of concave portions 11O. Moreover, because the battery cell 10 is a cylindrical battery cell, therefore the concave portion 11O is designed to have a curvature radius so as to match the cylindrical battery cell 10.

In one embodiment, the supporting mesh plate can be made of fiberglass, carbon fiber, polyvinylamine, carbon steel, stainless steel, copper alloy, aluminum alloy, or a combination of any two or more of the foregoing. On the other hand, the thermal interface material comprises a polymer matrix and a plurality of thermal conductive filler spread in the polymer matrix. According to the disclosures of China patent publication No. CN101351755A, the thermal conductive filler can be metal oxide particles, nitride particles, carbide particles, diboride particles, graphite particles, or metal particles.

Furthermore, in a practicable embodiment, the top surface and the bottom surface are both provided with a heat conductive protection layer thereon, and the heat conductive protection layer is made of paraffin, epoxy resin, polyurethane, silicone, rubber, polypropylene, thermally conductive phase change material, or a combination of any two or more of the foregoing. As such, the layer structure 111 comprises a first hardness, and the heat conductive protection layer comprises a second hardness that is greater than the first hardness. In addition, it can be further mixed a with ceramic filler within the heat conductive protection layer, and the ceramic filler can be alumina, magnesium oxide, zinc oxide, zirconium oxide, aluminum nitride, boron nitride, or silicon nitride. Moreover, it can also be further mixed with a carbon-based filler within the heat conductive protection layer, and the carbon-based filler can be graphite, graphene, silicon carbide, tungsten carbide, carbon nanotubes, graphite, carbon black.

In brief, the present invention discloses a double-layered thermal interface material (TIM) structure 11 for application in a battery device 1, so as to make the double-layered TIM structure 11 be sandwiched between each two adjacent battery cells 10 of the battery device 1. According to the present invention, the layer structure 111 comprising a top surface and a bottom surface is manufactured according to a plurality of gaps existing in the two adjacent rows of battery cells 10, therefore the top surface and the bottom surface both comprise a plurality of concave portions 11O. Particularly, there is a supporting mesh plate 112 buried in the layer structure 111 for making the layer structure 111 comprise all the advantages of softness, good malleability and good support capability. In such arrangement, when this novel double-layered TIM structure 11 is adopted in assembling N rows of battery cells 10 to become the battery device 1, the double-layered TIM structure 11 is firstly stacked on a first row of battery cells 10, and then a second row of battery cells 10 is tacked on the double-layered TIM structure 11. Subsequently, another double-layered TIM structure 11 is firstly stacked on the second row of battery cells 10, and then a third row of battery cells 10 is tacked on the double-layered TIM structure 11. And so on, N−1 numbers of the double-layered TIM structure 11 and N rows of battery cells 10 are therefore assembled to one battery device. Herein, it is worth explained that, two adjacent battery cells 10 are spaced by a gap, and two adjacent concave portions 11O are connected by a protuberance spacer, therefore the protuberance spacer is embedded into the gap after the M pieces of battery cell 10 are disposed on the plurality of concave portions 11O.

The method for manufacturing double-layered thermal interface material structure is provided.

Figure 6A:
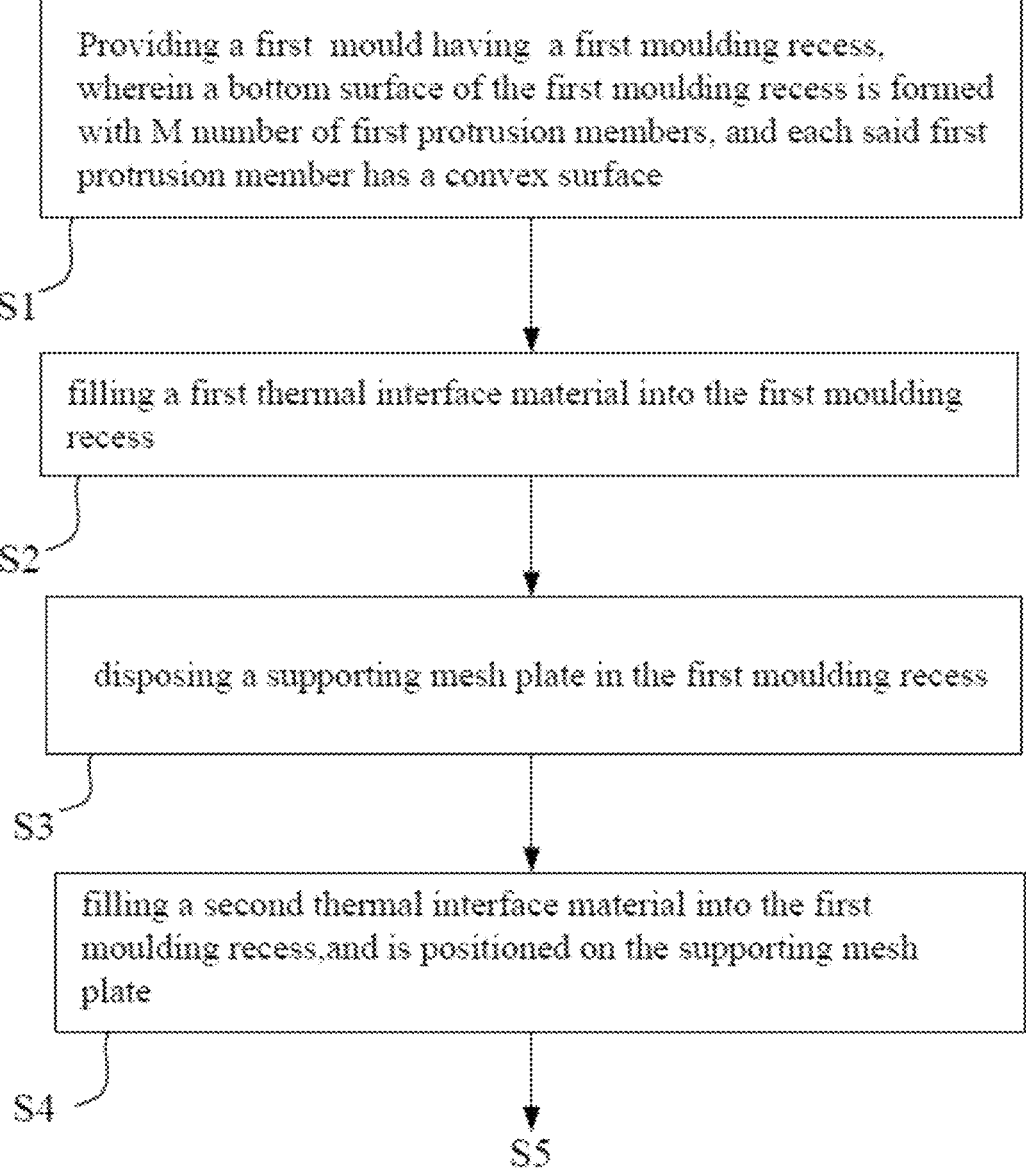
Figure 7A:
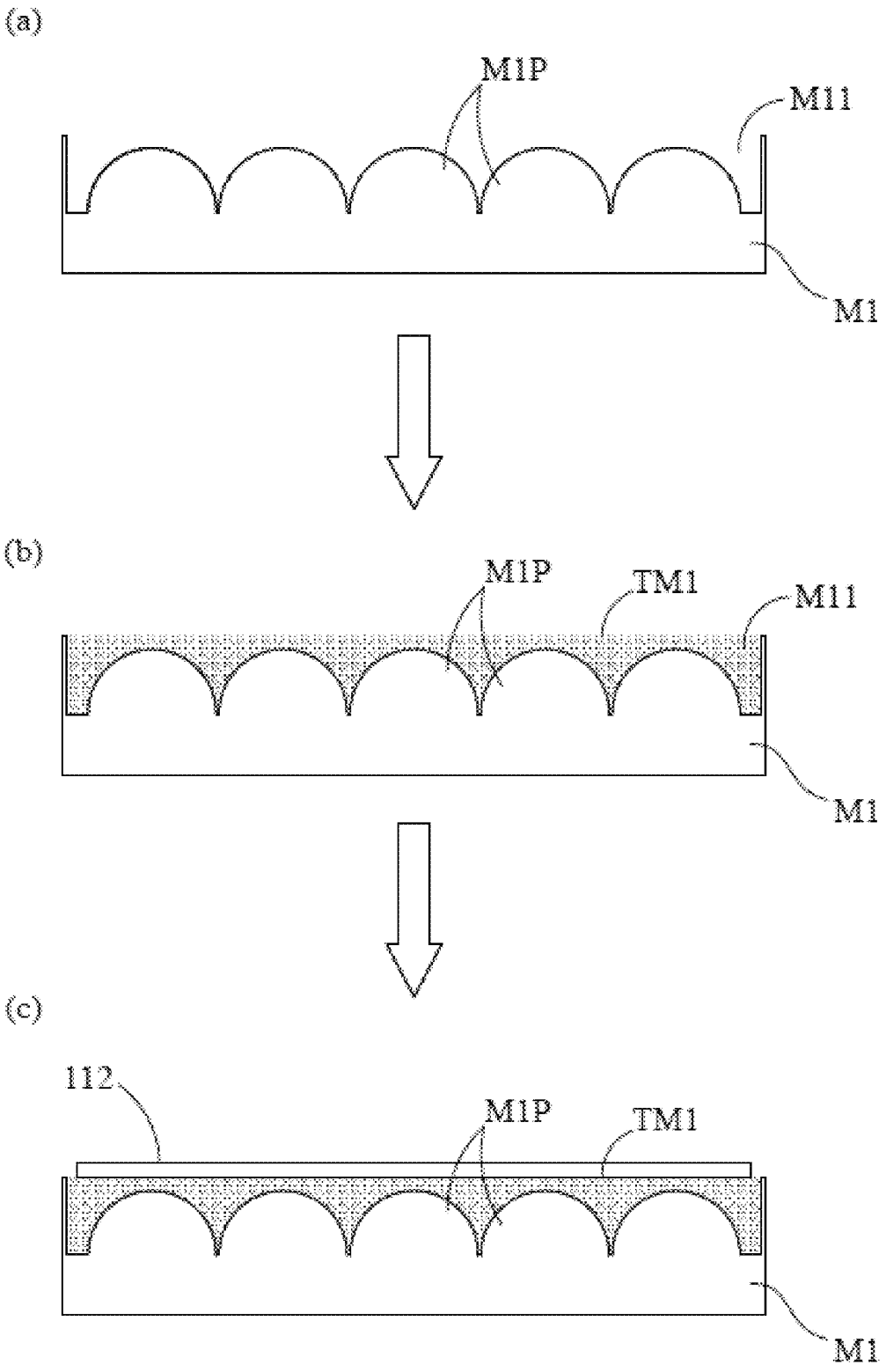
FIG. 7A and FIG. 7B show diagrams for describing manufacturing processes of the double-layered thermal interface material structure.
Figure 7B:
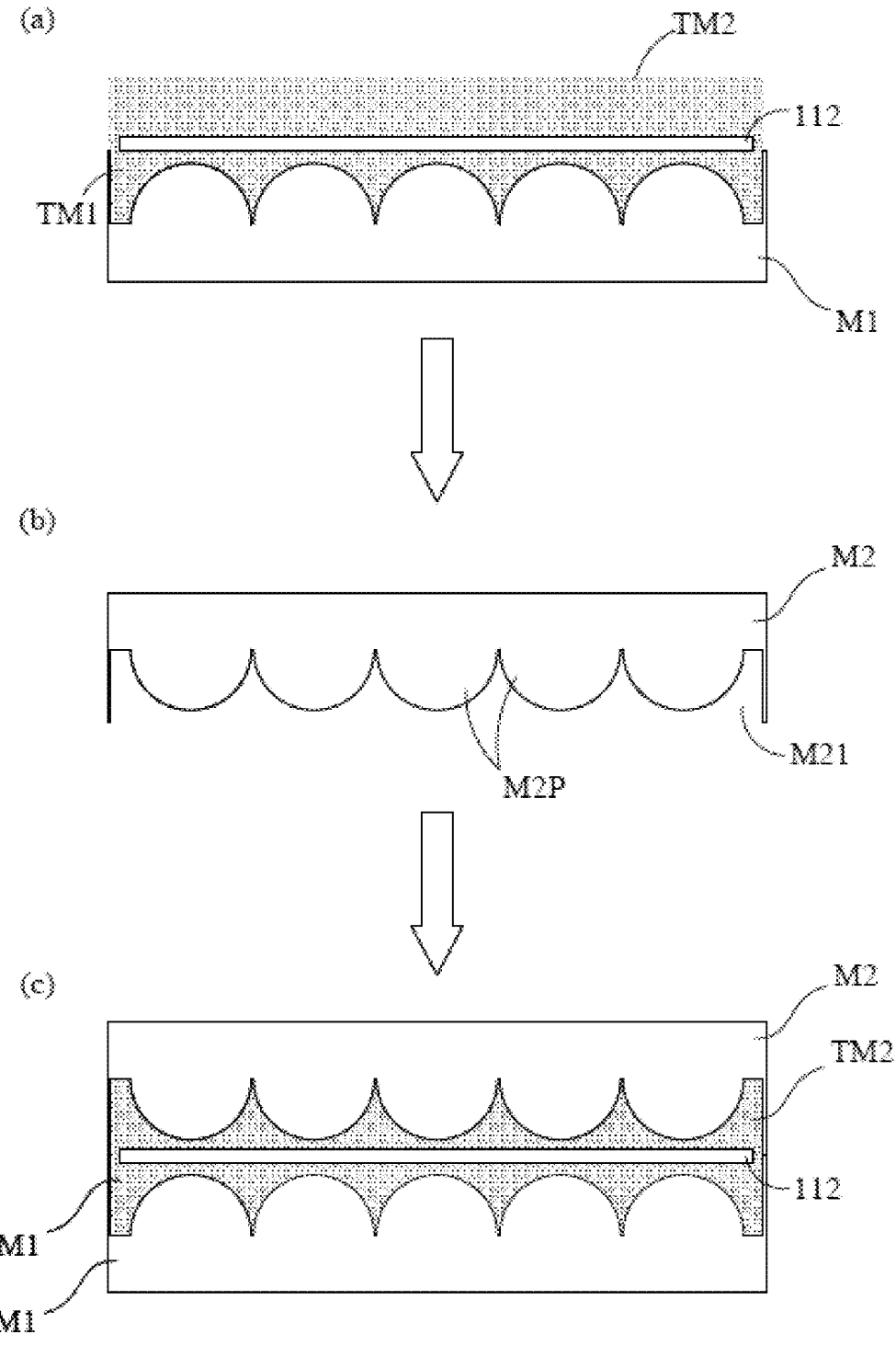

With reference to FIG. 6A and FIG. 6B, they are flowcharts of a double-layered thermal interface material structure manufacturing method according to the present invention. Moreover, FIG. 7A and FIG. 7B show diagrams for describing manufacturing processes of the double-layered thermal interface material structure. According to FIG. 6A and the manufacturing process diagram (a) shown in FIG. 7A, the method firstly proceeds to step S1, so as to provide a first mould M1 comprising a first moulding recess M11. In which, a bottom surface of the first moulding recess is formed with M units of first protrusion member M1P, M is an integer, and each of the first protrusion member M1P comprises a convex surface. According to FIG. 6A and the manufacturing process diagram (b) shown in FIG. 7A, the method subsequently proceeds to step S2. In step S2, a first thermal interface material TM1 is filled in the first moulding recess. Moreover, according to FIG. 6A and the manufacturing process diagram (c) shown in FIG. 7A, a supporting mesh plate 112 is disposed in the first moulding recess M11 after step S3 is completed.

According to FIG. 6A and the manufacturing process diagram (a) shown in FIG. 7B, the method subsequently proceeds to step S4, so as to fill a second thermal interface material TM2 into the first moulding recess M11, therefore the second thermal interface material TM2 is positioned on the supporting mesh plate 112. Moreover, according to FIG. 6B and the manufacturing process diagram (b) shown in FIG. 7B, the method is then proceeded to step S5, so as to provide a second mould M2 comprising a second moulding recess M21. In which, a bottom surface of the second moulding recess M21 is formed with M units of second protrusion member M2P, and each of the second protrusion member M2P comprises a convex surface. Furthermore, according to FIG. 6B and the manufacturing process diagram (c) shown in FIG. 7B, the second mould M2 is stacked on the first mould 2M in step S6, therefore the second moulding recess M21 receives the second thermal interface material TM2. As a result, after curing the first thermal interface material TM1 and the second thermal interface material TM2 to become a layer structure 111 by completing step S7, it is able to obtain a double-layered thermal interface material structure 11 by demoulding the second mould M2 and the first mould M1 (i.e., completing step S8).

It is worth further explaining that, the first thermal interface material TM1 and the second thermal interface material TM2 both comprise a polymer matrix and a plurality of thermal conductive filler spread in the polymer matrix, and the thermal conductive filler comprises a plurality of particles. The particles can be metal oxide particles, nitride particles, carbide particles, diboride particles, graphite particles, metal particles, or a combination of any two or more of the foregoing. Moreover, the polymer matrix is a curable polymer, and the curable polymer can be thermosetting polymer, photocureable polymer, or a mixture of polymer and curing agent.

According to FIG. 7A and FIG. 7B, it should be understood that, the first mould M1 and the second mould M2 are used to build up an upper part and a lower part of the layer structure 111. Therefore, it can be extrapolated that, the convex surface of the first protrusion member M1P and the convex surface of the second protrusion member M2P both have a curvature radius.

As explained in more detail below, the supporting mesh plate 112 used in the step S3 can be made of fiberglass, carbon fiber, polyvinylamine, carbon steel, stainless steel, copper alloy, aluminum alloy, or a combination of any two or more of the foregoing. Moreover, the mesh plate 112 has a plurality of pores, and each pore is fully filled with the thermal interface material during the manufacturing processes of the double-layered thermal interface material structure 11 shown as FIG. 7A and FIG. 7B.

Furthermore, it is able to form the top surface and the bottom surface of the layer structure 111 with a heat conductive protection layer thereon. In one embodiment, the heat conductive protection layer is made of a material, and the material can be paraffin, epoxy resin, polyurethane, silicone, rubber, polypropylene, thermally conductive phase change material, or a combination of any two or more of the foregoing. As such, the layer structure 111 comprises a first hardness, and the heat conductive protection layer comprises a second hardness that is greater than the first hardness.

The method for manufacturing battery device is provided

Figure 9:
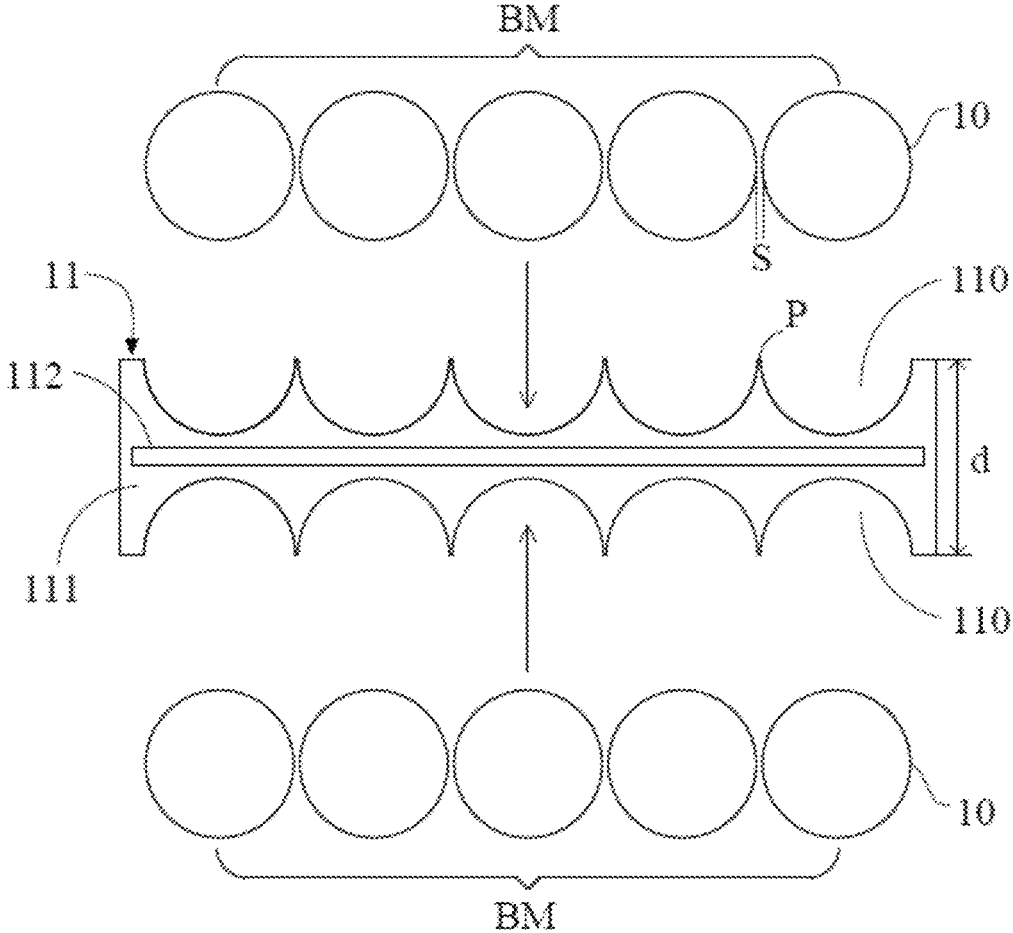
FIG. 9 shows a diagram for describing manufacturing processes of a battery device.

With reference to FIG. 8, it shows a flowchart of a battery device manufacturing method according to the present invention. Moreover, FIG. 9 shows a diagram for describing manufacturing processes of a battery device. As FIG. 8 and FIG. 9 show, the method firstly proceeds to step S1*a*, so as to provide a double-layered thermal interface material structure 11 comprising a layer structure 111 made of a thermal interface material and a supporting mesh plate 112 buried in the layer structure 111, wherein the layer structure 111 comprises a top surface and a bottom surface, and the top surface and the bottom surface both comprising a plurality of concave portions 11O. Then, the method subsequently proceeds to step S2*a*, so as to dispose a first battery module BM1 consisting of M pieces of battery cell 10 on the top surface, and to dispose a second battery module BM2 also consisting of M pieces of battery cell 10 on the bottom surface, wherein M is an integer.

As FIG. 9 shows, two adjacent battery cells 10 are spaced by a gap S, and two adjacent concave portions 11O are connected by a protuberance spacer P, therefore the protuberance spacer p is embedded into the gap S after the M pieces of battery cell 10 are disposed on the plurality of concave portions 11O. According to above descriptions, it is known that the top surface and the bottom surface are both provided with a heat conductive protection layer thereon, the layer structure comprises a first hardness, and the heat conductive protection layer comprises a second hardness that is greater than the first hardness.

Figure 10:
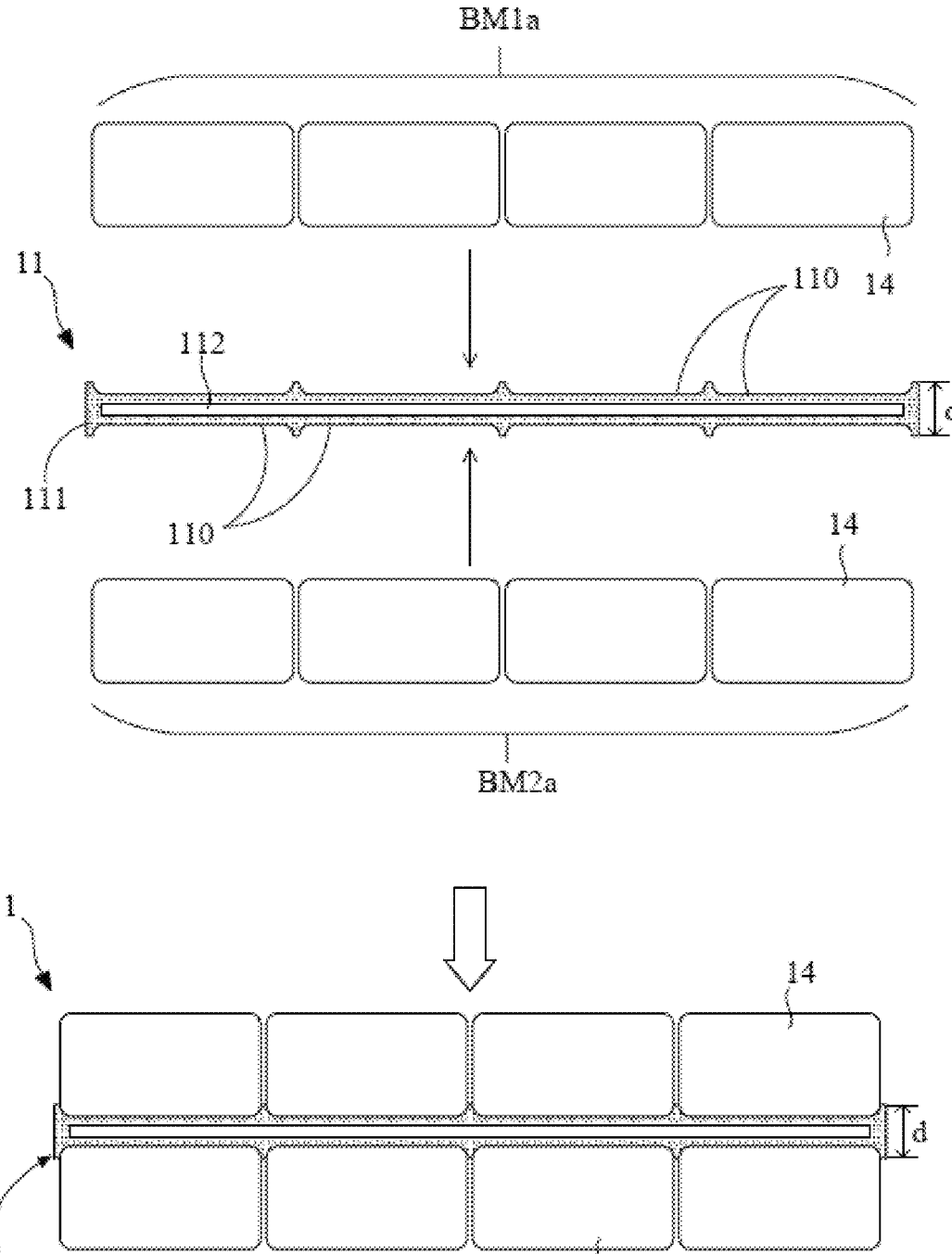
FIG. 10 shows a diagram for describing how to assembly a battery device.

On the other hand, FIG. 10 shows a diagram for describing how to assembly a battery device. As FIG. 8 and FIG. 10 show, the battery device manufacturing method can also adopted for manufacturing a specific battery device comprising two battery modules and one double-layered thermal interface material structure, of which the battery module consists of M pieces of prismatic battery cell. The method firstly proceeds to step S1*a*, so as to provide a double-layered thermal interface material structure 11 comprising a layer structure 111 made of a thermal interface material and a supporting mesh plate 112 buried in the layer structure 111, wherein the layer structure 111 comprises a top surface and a bottom surface, and the top surface and the bottom surface both comprising a plurality of concave portions 11O. Then, the method subsequently proceeds to step S2*a*, so as to dispose a first battery module BM1*a* consisting of M pieces of prismatic battery cell 14 on the top surface, and to dispose a second battery module BM2*a* also consisting of M pieces of prismatic battery cell 14 on the bottom surface, wherein M is an integer. As FIG. 10 shows, two adjacent prismatic battery cells 14 are spaced by a gap S, and two adjacent concave portions 11O are connected by a protuberance spacer P, therefore the protuberance spacer p is embedded into the gap S after the M pieces of prismatic battery cell 10 are disposed on the plurality of concave portions 11O.

Therefore, through the above descriptions, all embodiments of the double-layered thermal interface material structure according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A battery device comprising a double-layered thermal interface material structure for a stack type battery pack, comprising:
    a layer structure, being made of a thermal interface material, and comprising a body thickness; and
    a supporting mesh plate, being buried in the layer structure, and comprising a plate thickness that is smaller than the body thickness;
    wherein the layer structure comprises a top surface and a bottom surface, wherein the top surface and the bottom surface respectively comprise a plurality of upper concave portions and a plurality of lower concave portions;
    wherein the top surface comprises an upper heat conductive protection layer including a plurality of first ceramic fillers, and the bottom surface comprises a lower heat conductive protective layer including a plurality of second ceramic fillers;
    wherein the upper heat conductive protection layer and the lower heat conductive protection layer both are made of a thermally conductive phase change material;
    an upper row of battery cells, conforming the upper concave portions and disposed on the upper concave portions;
    a lower row of battery cells, conforming the lower concave portions and disposed under the lower concave portions;
    wherein the supporting mesh plate comprises a plurality of pores, and each of the pores being fully filled with the thermal interface material;
        wherein, the supporting mesh plate provides a support capability to support the upper row of battery cells.

2. The battery device comprising a double-layered thermal interface material structure of claim 1, wherein the supporting mesh plate is made of at least one material selected from a group consisting of fiberglass, carbon fiber, polyvinylamine, carbon steel, stainless steel, copper alloy, and aluminum alloy.

3. The battery device comprising a double-layered thermal interface material structure of claim 1, wherein the thermal interface material comprises a polymer matrix and a plurality of thermal conductive filler spread in the polymer matrix, and the thermal conductive filler comprising at least one selected from a group consisting of metal oxide particles, nitride particles, carbide particles, diboride particles, graphite particles, and metal particles.

4. The battery device comprising a double-layered thermal interface material structure of claim 1, wherein the top surface and the bottom surface are both provided with a heat conductive protection layer thereon, and the heat conductive protection layer being made of a material selected from a group consisting of paraffin, epoxy resin, polyurethane, silicone, rubber, polypropylene, and thermally conductive phase change material.

* * * * *